July 12, 1960 O. BOUCHARD Re. 24,844

COMBUSTION GAS RECUPERATOR AND SMELL AND SMOKE CONSUMER

Original Filed April 28, 1953 2 Sheets-Sheet 1

INVENTOR—
Oride Bouchard

COMBUSTION GAS RECUPERATOR AND SMELL AND SMOKE CONSUMER

Original Filed April 28, 1953 2 Sheets-Sheet 2

INVENTOR
Otide Bouchard

United States Patent Office

Re. 24,844
Reissued July 12, 1960

24,844

COMBUSTION GAS RECUPERATOR AND SMELL AND SMOKE CONSUMER

Ovide Bouchard, deceased, late of Quebec, Canada, by Marie Villeneuve Bouchard, legal representative, Riviere des Prairies, Quebec, Canada, assignor to Daniel N. Crowley, Peabody, and Aime A. Gauthier, Salem, Mass.

Original No. 2,811,937, dated Nov. 5, 1957, Ser. No. 351,669, Apr. 28, 1953. Application for reissue Oct. 30, 1959, Ser. No. 856,883

4 Claims. (Cl. 110—8)

Matter enclosed in heavy brackets [ ] appears in the original patent but forms no part of this reissue specification; matter printed in italics indicates the additions made by reissue.

This invention relates to a combustion gas recuperator and smell and smoke consumer.

More especially, the invention relates to a burner for all kinds of fuels—solid, liquid or gas—and finds useful application in incinerators, stoves and furnaces.

The principal object of the invention is to provide a fuel burning device of high efficiency and promoting complete combustion.

A specific object is to provide an attachment adapted easily to be applied to a stove or a furnace, by which the unburned gases within the combustion chamber are separated from the burnt gases and mixed with air, and the mixture returned to the combustion chamber.

Another specific object is to provide a sealed garbage incinerator of greatly increased efficiency and operating to consume or burn a very large proportion of the gases generated by the combustion of the combustible matter comprised in the garbage.

Another specific object is to provide a fuel burner, especially an incinerator, wherein a grate system is manually adjustable to vary the effective area of the air inlet.

In the drawings, wherein like numerals of reference indicate corresponding parts of the various figures, Figure 1 is a longitudinal section of the incinerator;

Figure 1:
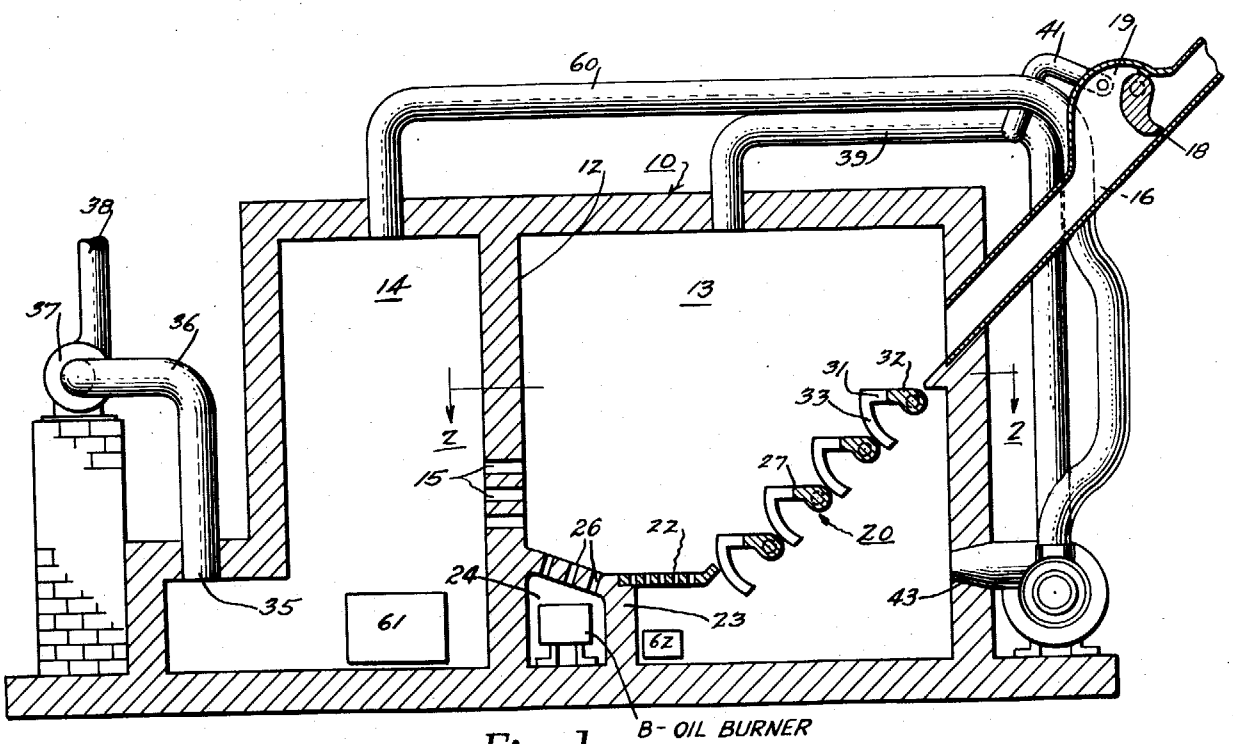
Figure 3:
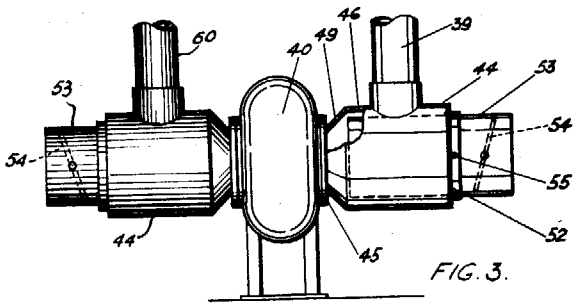
Figure 3 is a fragmentary view of Figure 1, looking from right to left.
Figure 2:
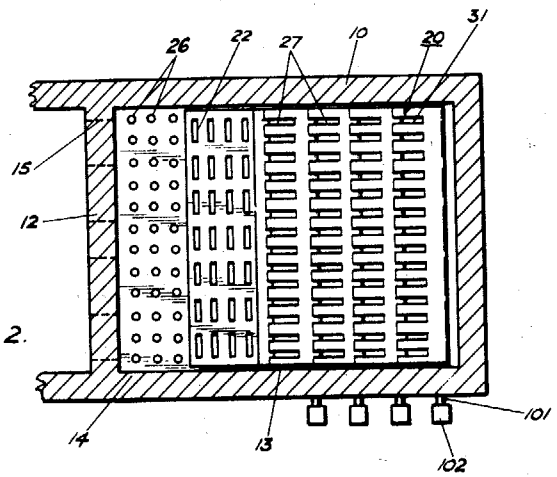
Figure 2 is a section on line 2—2 in Figure 1.

Referring to Figures 1 to 3 of the drawings, which show a garbage incinerator embodying the invention, 10 is a housing. The housing is constructed to withstand high temperatures, and includes a refractory lining (not shown). The casing is divided by a refractory partition or wall 12 into two chambers, 13 and 14, in communication one with the other through openings or jets 15.

The charge of garbage to be burned in the incinerator is fed or loaded into the chamber 13 by an inclined tubular chute 16 extending through one wall of the casing. A suitable manually-operated pivoted door 18 within the chute serves, when closed, to prevent escape of gases and when open, to admit the charge. The chute is formed with a dome 19.

The garbage sliding down through the chute 16 falls upon the grate, generally shown as 20, within the first or igniting chamber 13. The grate extends rearwardly toward, but terminates short of, the apertured partition 12.

A section of the grate, shown as 22, is preferably horizontal and is disposed at a distance forwardly of the partition 12. The front edge of the grate section 22 abuts and is in part supported by one wall 23 of an oil burning chamber 24. Suitable oil burning apparatus B is operated to burn oil within the chamber, the burning gases being projected into the chamber 13 through orifices or jets 26. The jets enter the chamber 13 adjacent to the partition 12 and adjacent to the jets 15.

Forwardly of the fixed horizontal grate section 22 is a series of transverse grate sections 27 pivotally supported at their opposite ends in the side walls of the casing so as to be rocked or angularly adjusted on their axes or pivots. Each such section, which is formed with parallel slots or vents 31, is formed to present a flat or straight garbage-supported surface 32 and an end arcuate depending portion 33. The radius of the portion 33 has as its centre the axis of the pivots supporting such section, and the axes of the respective sections are so spaced that the outer face of the arcuate portion of each grate section lies close to the adjacent rearward section, irrespective of the angular position of the sections. The pivots of each of the sections conveniently take the form of trunnions 32 one of which may project through one of the side walls of the casing. The outer or projecting portion of such trunnion may be, say square in cross section, so that the section may be rocked from the outside of the casing as with a suitable wrench-like tool.

By altering the angular position of the grate sections, the effective air-intake capacity of the grate can be varied, being increased as the sections are angularly displaced or rocked to bring the portion 32 of the section toward horizontal position and being decreased as the sections are displaced in the opposite direction.

Communicating with the lower end of the chamber 14 through an opening 35 is the lower end of a duct 36; the other end of the duct opens into the housing of a suitable fan 37 by the operation of which the lower strata of gases in the chamber 14 are sucked and forced up into a chimney 38.

Leading from the roof of the chamber 13 is a duct 39, the duct being operatively connected to one side of a blower 40 driven by an electric motor. The discharge end of the blower is operatively connected as by duct 43 with the chamber 13 below the grate. The hot gases sucked out of the chamber 13 are thus returned into the chamber and forced up through the grate. The dome 19 is connected to the duct 39 as by a pipe 41.

Operatively interposed in the length of the duct 39 is an air admission device 44 by which air is mixed with the hot gases and are sucked out of the chamber 13 and dome 19 before the mixture passes through the blower.

As best seen in Figure 3, the air admission device may consist of a box or casing 46 secured to one (inlet) side of the blower 40 and interposed in the length of the duct 39. One side of the casing is formed with a conical portion 49 having an opening defined by flange 45 by which the casing is secured to the blower. The opposite side of the casing is formed with a circular opening defined by a circular collar or flange 52 slidably receiving a pipe 53. The pipe 53 carries an adjustable damper 54. The pipe 53 is adjustably secured in the collar 52 as by a screw 55. As the inner end of the pipe 53 is presented to the conical shaped end wall portion 49 of the box 46, the effective communication between the duct 39 and the blower varies according to the position of the pipe 53 within the box. The volume of air sucked into the blower will be constant for a predetermined speed of the blower and for a predetermined setting of the pipe 53, whereas the volume of gases sucked into the blower varies with the longitudinal position of the pipe 53. Therefore, the air to gas ratio of the mixture entering the blower (and being discharged into the chamber 13) can be determined with fair accuracy.

Also leading from the roof of the chamber 14 is a duct 60 which is effectively connected to the opposite (inlet) side of the blower 40, an air admission device similar to that previously described being effectively interposed in the length on the duct 60 (see Figure 3).

Clean out doors 61 and 62 are provided for access into the chambers 14 and 13, respectively.

The operation of the incinerator just described is as follows:

A charge of garbage is dumped into the chamber 13, and the door 18 closed. The charge should preferably be such that the chamber is fairly well filled. The blower is turned on, and the oil burner next turned on. The burning oil will ignite part of the garbage adjacent to the partition 12. As the volume of the mixture of air and gases entering the chamber 13 is greater than the volume of gas sucked out of the chamber 13, through the duct 39, the burning gases will pass through the vents or jets 15, to be discharged into the second or combustion chamber 14. The partition 12, especially around the jets 15, becomes heated. When the partition is adequately heated, the oil burner may be turned off. The heat generated within the chamber 13 heats the charge of garbage, distilling the same to release the gases. The gases not ignited in the chamber 13, mostly CO, rise up through the charge to be sucked out of the chamber and mixed with air in the air admission device. The mixture is forced into the chamber 13 below the grate by the blower. The processing of the garbage continues until all the combustible gases have been burned.

With the burning gases entering the second chamber 14, there may be some unconsumed combustible gases in the form of CO. The burned gases or $CO_2$ gravitate toward the bottom of the chamber 14 and are sucked out into the chimney. Any CO, on the other hand, rises to the roof of the chamber and is sucked out of the chamber and through the air admission device associated with such chamber. Such gases are mixed with air in the air admission device and forced into the chamber 13, to be burned within the chamber.

What is claimed is:

1. In fuel burning apparatus, a first chamber, a grate in said chamber, a second chamber, a vertical wall forming the division between said chambers, said wall having an orifice affording communication between said chambers, a burner in said first chamber adjacent said wall and below said orifice, an outside duct connecting the top of said first chamber with said first chamber below said grate, means operatively associated with said duct for sucking gases out of said first chamber into said duct for delivery of such gases back into said first chamber, an air admission device interposed in the length of said duct for admitting air from atmosphere into said duct to mix with the gases sucked out of said first chamber, means communicating with said second chamber below said orifice for sucking gases out of said second chamber for discharging such gases to atmosphere, and an outside duct connecting the top of said second chamber with said first chamber below said grate, said last-mentioned duct being operatively associated with said first-mentioned sucking means for sucking gases into said last-mentioned duct for delivery of such gases into said first chamber, a second air admission device interposed in said last-mentioned duct for admitting air from atmosphere into said last-mentioned duct to mix with the gases sucked out of said second chamber.

2. In the apparatus of claim 1, said grate comprising a plurality of pivotally supported grate sections disposed in contiguous stepped-up sequence, each of said sections having a flat slotted fuel-supporting portion and a depending arcuate slotted portion, the arrangement being such that the arcuate portion of one section lies in close proximity to the straight portion of an adjacent section irrespective of their relative rotary positions.

*3. In a fuel burning apparatus, a first chamber, a grate in said chamber, a second chamber, a vertical wall forming the division between said chambers, said wall having an orifice affording communication between said chambers, a burner operatively associated with said first chamber for igniting combustible material on said grate, an outside duct connecting the top of said first chamber with said first chamber below said grate, means operatively associated with said duct for sucking gases out of said first chamber into said duct for delivery of such gases back into said first chamber, means communicating with said second chamber below said orifice for sucking gases out of said second chamber for discharging such gases to atmosphere, and an outside duct connecting the top of said second chamber with said first chamber below said grate, said last-mentioned duct being operatively associated with said first-mentioned sucking means for sucking gases into last-mentioned duct for delivery of such gases into said first chamber, air admission means operatively associated with said first-mentioned sucking means for admitting air from atmosphere to mix with the gases sucked out of said first and second chamber.*

*4. In the apparatus of claim 3, said grate comprising a plurality of pivotally supported grate sections disposed in contiguous stepped-up sequence, each of said sections having a flat slotted fuel-supporting portion and a depending arcuate slotted portion, the arrangement being such that the arcuate portion of one section lies in close proximity to the straight portion of an adjacent section irrespective of their relative rotary positions.*

References Cited in the file of this patent or the original patent

UNITED STATES PATENTS

| | | |
|---|---|---|
| 195,495 | English | Sept. 25, 1877 |
| 238,256 | Smith | Mar. 1, 1881 |
| 673,066 | Shoemaker | Apr. 30, 1901 |
| 823,962 | McLeod | June 19, 1906 |
| 1,013,988 | Conway | Jan. 9, 1912 |
| 1,531,766 | Trimborn | Mar. 31, 1925 |
| 1,651,636 | Shaughnessy | Dec. 6, 1927 |
| 1,861,135 | Riley | May 31, 1932 |

FOREIGN PATENTS

| | | |
|---|---|---|
| 9,813 | Australia | Oct. 24, 1933 |